United States Patent [19]

O'Connor et al.

[11] Patent Number: 4,565,244

[45] Date of Patent: Jan. 21, 1986

[54] TUBULAR ARTICLES OF MANUFACTURE AND METHOD OF MAKING SAME

[75] Inventors: Joseph M. O'Connor, Chicago; Stephen F. Pasternak, Park Ridge, both of Ill.

[73] Assignee: Peerless of America, Inc., Chicago, Ill.

[21] Appl. No.: 63,101

[22] Filed: Aug. 2, 1979

Related U.S. Application Data

[62] Division of Ser. No. 890,539, Mar. 27, 1978, Pat. No. 4,203,311.

[51] Int. Cl.⁴ .................... F28F 3/04; F28F 1/16
[52] U.S. Cl. .................... 165/181; 165/171; 29/157.3 V
[58] Field of Search ................ 165/181, 171; 29/157.3 V

[56] References Cited

U.S. PATENT DOCUMENTS

| 2,999,308 | 9/1961 | Pauls | 29/157.3 V |
| 3,112,559 | 12/1963 | Pauls | 29/157.3 V |
| 3,247,583 | 4/1966 | Hansson et al. | 165/181 X |
| 4,176,654 | 12/1979 | Zinn et al. | 165/171 |

Primary Examiner—Albert W. Davis, Jr.
Attorney, Agent, or Firm—Emrich & Dithmar

[57] ABSTRACT

A tubular heat exchanger blank is comprised of a one-piece body portion having a plurality of elongated tubular members disposed in side-by-side relation to each other. Each of the tubular members includes a sidewall with the sidewall of adjacent tubular members being connected together by portions which are lesser in thickness than the adjacent sidewall and which extend the length of the body portion. The heat exchanger blank permits initial forming operations upon a plurality of elongated tubular members and subsequent manufacturing and separation steps to occur during the manufacture of heat exchanger elements.

6 Claims, 6 Drawing Figures

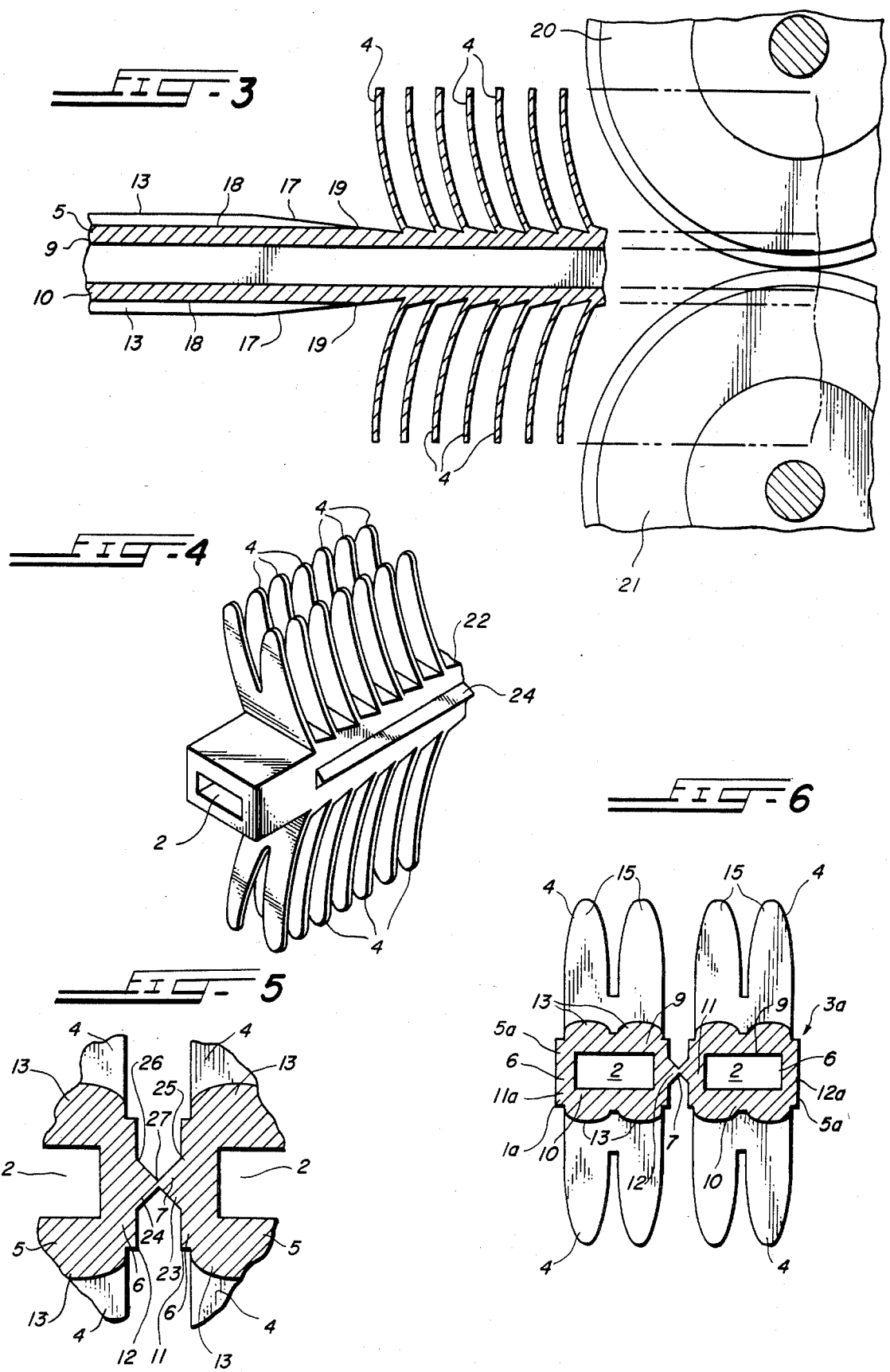

TUBULAR ARTICLES OF MANUFACTURE AND METHOD OF MAKING SAME

This is a division of application Ser. No. 890,539, filed Mar. 27, 1978. Now U.S. Pat. No. 4,203,311 granted May 20, 1980.

BACKGROUND OF THE INVENTION

This invention relates to tubular articles of manufacture and the method of making the same, and, more particularly, to tubular articles of manufacture and the method of making the same, wherein, during the manufacture of such tubular articles, and after the initial forming thereof, subsequent manufacturing steps are taken, such as, for example, the forming of external spines or fins thereon in the manufacture of a heat exchanger.

It is a primary object of the present invention to afford a novel method of making a tubular article of manufacture.

Another object is to afford a novel tubular article of manufacture.

A further object of the present invention is to afford a novel method of making a heat exchanger.

Yet another object is to afford a novel heat exchanger.

Although, in its broader aspects, it is not limited thereto, the present invention relates to, and is particularly well adapted for affording heat exchangers of the general nature of the heat exchangers shown in U.S. Pat. Nos. 3,202,212, 3,229,722, 3,692,105, 3,746,086, 3,850,236, 3,866,286, 3,877,517, 3,886,639, 3,901,312 and 3,947,941, wherein spines or fins are sliced, cut or gouged from walls of tubular members.

Oftentimes, in the manufacture of tubular articles of manufacture, wherein additional manufacturing steps are performed after the initial forming of a tubular member, the performing of the additional manufacturing steps poses a substantial problem. For example, if tubular members of narrow width are initially formed and subsequent manufacturing steps, such as, for example, the fin-forming steps disclosed in the aforementioned patents, are to be performed, it has been found that it oftentimes is extremely difficult, if not impossible to securely hold the tubular member against twisting, turning or other movement during the performance of the additional manufacturing steps. This is particularly true when the height of the tubular member exceeds the width or base thereof. It is an important object of the present invention to enable such difficulties to be overcome in a novel and expeditious manner.

Another disadvantage of performing such additional manufacturing steps on relatively small, individual tubular members is the time element and expense involved. Performing such manufacturing steps on individual tubular members, one-by-one, is relatively slow and time consuming and, normally, is undesirable from the standpoint of efficient manufacturing. In the past, in an endeavor to overcome such difficulties and disadvantages, efforts have been made to simultaneously perform the aforementioned additional manufacturing steps on a plurality of such individual tubular members. For example, efforts have been made to clamp or otherwise hold a plurality of such individual tubular members in side-by-side relation to each other and to simultaneously perform the additional manufacturing steps, such as, for example, the forming of fins thereon in the manner disclosed in the aforementioned patents. This has the advantage, when and if successful, of being more efficient and less time-consuming in the forming of the fins, or the like, such manufacturing steps being performed on a plurality of tubular members simultaneously, rather than being performed on each individual tubular member, alone. However, such procedure has several inherent disadvantages.

For example, for one thing, it has been found to be extremely difficult to hold such a plurality of individual tubular members in fully stationary position relative to each other during a complete fin-forming series of steps, or the like. When such tubular members are not reliably held in properly indexed relation to each other throughout a complete operation of the aforementioned type, it is impossible to afford tubular members of uniform quality.

Another inherent disadvantage, which has come to our intention, is that even when an operator is successful in fully stationarily holding such individual tubular members in indexed relation to each other during a complete series of such manufacturing steps, the tubular members, themselves, often vary sufficiently in dimension that the end products afforded by the individual tubular members are not uniform in size. For example, it has been found that when an extrusion is made, and, particularly, when a long extrusion is made, because of what is believed to be the contraction or expansion of the parts of the extrusion die by reason of differences in temperature, and the like, the tubular member produced at the beginning of the operation oftentimes is of a different outside size than that produced later in the operation. As a result, when such a long extrusion is subsequently cut up into shorter lengths to afford the individual tubular members, which are to be placed in side-by-side relation to each other for the aforementioned simultaneous performance of manufacturing steps on the plurality of tubular members, the differences in size make it difficult to effectively clamp or otherwise hold the individual tubular members in fully stationary relation to each other; and, even when they are successively so held, the differences in size of the side-by-side portions of the tubular members causes variations in the results of the operations on the various tubular members. For example, when fins are being simultaneously cut on such side-by-side tubular members across the full lateral width of such a cluster of tubular members, the differences in size of the different tubular members commonly causes the formation of fins of different lengths on adjacent ones of tubular members. It is another important object of the present invention to enable disadvantages of the aforementioned type to be overcome in a novel and expeditious manner.

Another object of the present invention is to enable a plurality of tubular members, which at the completion of the manufacturing operations thereon will constitute individual, or, at least, groups of a lesser number of tubular members, to be initially afforded as a single, unitary structure on which the aforementioned additional manufacturing steps may be performed simultaneously on all of the members; and to enable such members to be, thereafter, quickly and easily separated from each other in a novel and expeditious manner.

Another object of the present invention is to afford a novel blank from which individual tubular members may be separated.

Another object of the present invention is to enable such separation to be quickly and easily effected while affording a blank of the aforementioned type which has sufficient structural strength and integrity as to insure that the aforementioned additional manufacturing steps properly may be performed thereon.

Yet another object of the present invention is to afford a novel heat exchanger embodying fins projecting outwardly from opposite lateral sides thereof and a novel rib extending outwardly from at least one other lateral side, which latter side extends between the first mentioned lateral sides.

An object ancillary to the foregoing is to enable a ribbed and finned heat exchanger of the aforementioned type to be produced in a novel and expeditious manner.

Other and further objects of the present invention will be apparent from the following description and claims and are illustrated in the accompanying drawings which, by way of illustration show preferred embodiments of the present invention and the principles thereof and what we now consider to be the best mode in which we have contemplated applying these principles. Other embodiments of the present invention embodying the same or equivalent principles may be used and structural changes may be made as desired by those skilled in the art without departing from the present invention and the purview of the appended claims.

DESCRIPTION OF THE DRAWINGS

In the drawings:

FIG. 3 is a fragmentary, longitudinal sectional view taken substantially along the line 3—3 in FIG. 2;

FIG. 4 is a fragmentary, perspective view, similar to FIG. 1, but showing a novel, individual, finished tubular member, in the form of a heat exchanger, formed from the tubular member blank of FIG. 1;

FIG. 5 is an enlarged, fragmentary sectional view of a portion of the structure shown in FIG. 2; and FIG. 6 is a transverse sectional view, similar to FIG. 2, but showing a modified form of the present invention.

DESCRIPTION OF THE EMBODIMENTS SHOWN HEREIN

Figure 1:
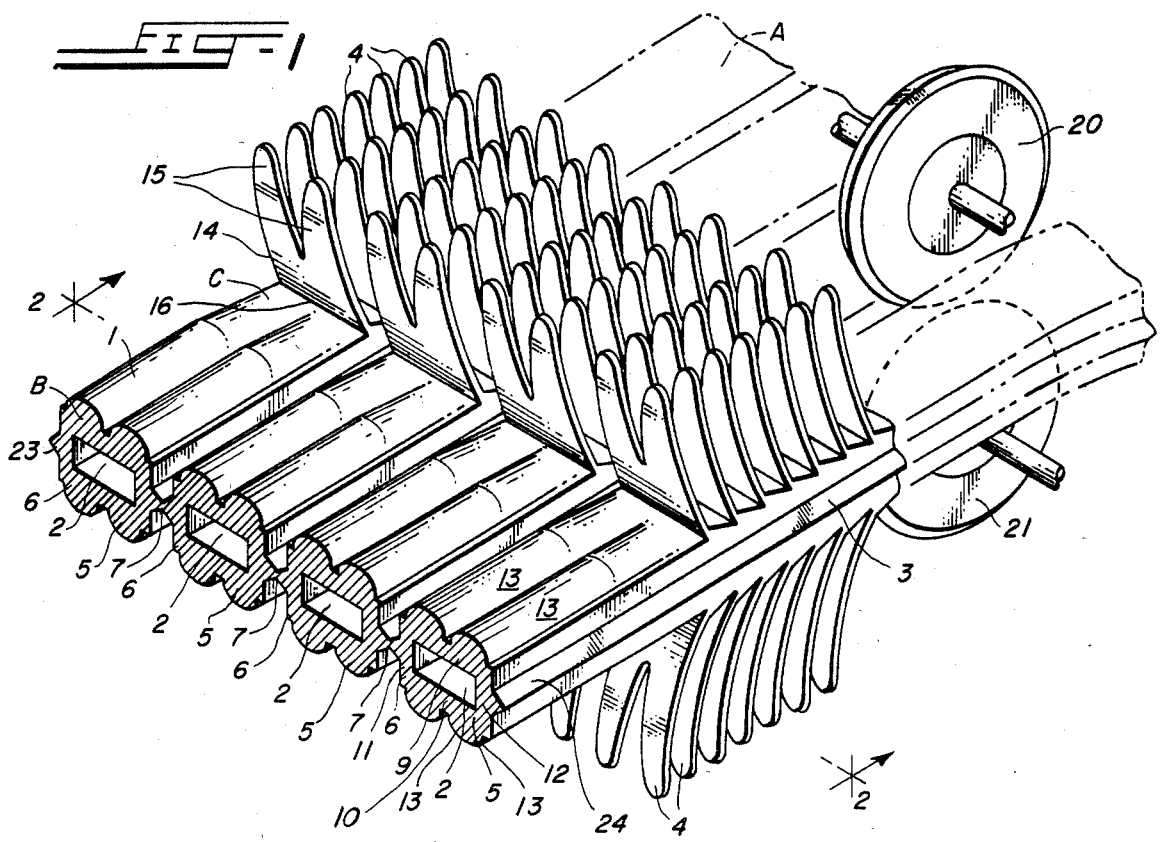
FIG. 1 is a perspective view of a length of tubular member embodying the principles of the present invention, and illustrating the principles of the method of the present invention.

An elongated, one-piece multi-ported tubular member or tubular member blank 1 having a plurality of ports 2 extending longitudinally therethrough in parallel spaced relation to each other, and embodying the principles of the present invention, is shown in FIG. 1 to illustrate the presently preferred embodiment of the present invention. The tubular member 1, shown in FIG. 1, is illustrative of the initial form of tubular member that it is desired be first produced in the practice of the presently preferred method of the present invention. It is shown as the left, or leading end of a tubular member 3 which is integral therewith, and which constitutes a heat exchanger blank on which fins 4 have been formed, in a subsequent manufacturing process or step, in accordance with the principles of the preferred method of the present invention. However, it is to be remembered that, in its broader aspects, the present invention is not limited to heat exchangers or to the method of making the same, as will be discussed in greater detail presently.

The tubular member 1 is shown in FIG. 1 as embodying four elongated tubes 5 disposed in uniplaner, parallel, side-by-side relation to each other. As will be appreciated by those skilled in the art, the tubular member 1 is shown as embodying four such tubes 5 merely by way of illustration and not by way of limitation, and it may embody a greater or lesser plurality of tubes without departing from the purview of the present invention.

Each of the tubes 5 embodies a side wall 6, which defines the outer periphery of a respective one of the ports or passageways 2 extending longitudinally through the tubular member 1. The tubes 5 are spaced from each other, and adjacent ones of the tubes 5 are connected together by connectors 7 which extend therebetween. The connectors 7 of the tubular member 1 are formed integrally with the adjacent tubes 5 and extend longitudinally of the tubular member 1 throughout the entire length thereof.

The connectors 7 are of such size and construction that they firmly hold the tubes 5 in assembled relation to each other, while enabling adjacent ones of the tubes 5 to be readily separated from each other, as will be discussed in greater detail hereinafter.

In the preferred form of the tubular member 1 shown in FIG. 1, each of the side walls of each of the tubes 5 embodies a top portion 9, a bottom portion 10 and two laterally disposed side portions 11 and 12, with two ribs 13 projecting outwardly from each of the top and bottom portions 9 and 10 and extending longitudinally the length thereof in parallel adjacent relation to each other. The ports 2 and the side walls 6, shown in FIGS. 1-5, are rectangular in transverse cross-section. However, in the broader aspects of the present invention, they could be of other shapes, such as, for example, round.

In the preferred form of the heat exchanger blank 3 manufactured from the tubular member 1, the fins 4 project outwardly from the upper wall portions 9 and the lower wall portions 10 of each of the tubular members 5, and, in fact, portions of the fins 4 are formed from portions of the aforementioned upper walls 9 and lower walls 10, as will be discussed in greater detail hereinafter.

Each of the fins 4 projecting outwardly from respective ones of the tubes 5, embodies an elongated base portion 14 having two spines 15 projecting outwardly from one longitudinal edge thereof. Each of the fins 4 extends longitudinally across the respective upper and lower wall portions 9 and 10 of the tube 5 from which it projects in substantially transverse relation to the length of the respective tube 5, and each of the fins 4 embodies one of the aforementioned base portions 14, having a lower longitudinal edge portion 16 integral with the respective upper or lower wall portion 9 or 10 of the tube 5 to which it is attached. Each base portion 14 projects outwardly from the respective upper or lower wall portion 9 or 10, preferably in substantially perpendicular relation thereto, with the spines 15 thereon spaced along and projecting outwardly from the longitudinal edge of the base portion 14 remote from the respective tube 5.

The tubular member 1, from which the heat exchanger, shown in the drawings, is made, may be made of any suitable material, such as, for example, aluminum, and may be made in any suitable manner, but, preferably, is made by extruding the same.

In making the heat exchanger blank 3, a tubular member such as the tubular member 1, and embodying the ribs 13 extending the full length thereof may first be made of any suitable material, such as, for example, aluminum. Thereafter, the fins 4 may be successively formed on each of the upper portions 9 and lower portions 10 of all of the side walls 5 from one end portion of the tubular member 1, such as the end portion A, toward the other end portion, such as the end portion B, thereof, FIG. 1. The fins 4 may each be cut or gouged from the ribs 13 and the tubes 5 by means of a suitable cutting tool which first cuts along lengthwise of the ribs 13 to the right, as viewed in FIG. 3, to form the surface 17 which terminates at its lower end, as viewed in FIG. 3, at the base 18 of the ribs 13, the cutting tool then continuing to cut along lengthwise of the wall portions 9 and 10 of the tubes 5 underlying the ribs 13, to form the surface 19, FIG. 3. In the practice of the preferred form of the present invention, the laterally spaced fins 4 are each cut in this manner on all of the tubes 5, and are then bent outwardly preferably to a position approximately perpendicular to the plane of the respective wall portions 9 or 10 on which they are formed.

After thus forming the fins 4 along the desired length of the tubular member 1, such as the length A-C shown in FIG. 1, the tubular member 1 may be severed transversely to its length at the point C to thereby afford a heat exchanger blank having fins 4 extending substantially the full length thereof. As will be appreciated by those skilled in the art, if desired, the formation of the fins 4 may be commenced inwardly of the end portion A of the tubular member 1, and the tubular member 1 may be severed outwardly to the left, as viewed in FIG. 1, of the last formed fin 4 to thereby afford end portions which project outwardly from the outermost fins 4 to afford connecting members at each end of the finished heat exchanger. In such last mentioned construction, not shown, the ribs 13 of the tubular member 1, disposed outwardly of the aforementioned outermost fin, preferably are removed by suitable means, such as, for example, grinding to thereby afford a smooth-walled end portion for the completed heated exchanger.

At this stage of the performance of the manufacturing steps being followed to produce a heat exchanger, all of the tubes 5 remain connected to each other by the connectors 7. Thereafter, those tubes 5 which it is desired to separate from each other may be so separated by severing the connector 7 extending therebetween. Such severing of the connectors 7 may be accomplished in any suitable manner, such as, for example, by means of a suitable shearing press or slicing machine, or, if desired, by feeding the member 3, with the fins formed thereon, longitudinally between wedging rollers or pinch rollers disposed between the tubes 5 to be separated, with the rollers forcing the latter tubes 5 apart to sever the connectors 7 therebetween by tearing the same. However, we presently prefer to sever the desired connecting members 7 by feeding the member 1 longitudinally between slitter wheels or slicing wheels, such as the wheels 20 and 21, FIGS. 1 and 2. As is well known in the art, in such an operation of a slitter machine, the wheels 20 and 21 are disposed on opposite sides of the connectors 7 to be severed, such as, for example, the connector 7 between the first and second tubes 5 at the right side of the tubular member 1, shown in FIG. 2, the wheels 20 and 21 extending between the adjacent tubes 5 to be separated and being effective to slice or shear the connector 7 disposed therebetween during longitudinal movement of the tubular member 1 relative to the wheels 20 and 21. As will be appreciated by those skilled in the art, such a severing operation may be effected similtaneously on as many of the connectors 7 as is desired with a single slitter machine.

When a single tube 5 is thus severed from the tubular member 1 in the aforementioned manner, a heat exchanger, such as the heat exchanger 22, shown in FIG. 4, may thus be afforded. The separation of the heat exchanger 22 from the remainder of the tubular member 1 having been accomplished after the manufacturing steps, including the formation of the fins 4 thereon, were completed, the manufacture of the heat exchanger 22 has been accomplished without the problem of holding a small tubular member, such as, for example, a single tube 5 of the tubular member 1 in proper position during the aforementioned manufacturing steps. Also, by forming heat exchangers, such as the heat exchanger 22, in the aforementioned manner, a plurality of such heat exchangers may be similtaneously provided with the fins 4 in a highly efficient and practical manner.

In the preferred form of the present invention, each of the connectors 7 is of the so-called butterfly shape in transverse cross section, having two substantially wedge-shaped, outwardly flaring end portions 23 and 24 having outer ends or bases 25 and 26 connected to, and in fact, integrally formed with the side wall portions 11 and 12, respectively, of the adjacent tubes 5, as shown in FIG. 5. The end portions 23 and 24 are connected together at their inner ends, midway between the bases 25 and 26 by a reduced portion 27, which is of substantially lesser thickness in a vertical direction, as viewed in FIG. 5, than the base portions 25 and 26.

In the preferred form of the present invention, the thickness of the reduced portion 27 is such that it may be readily severed without distorting the side wall 6 of the adjacent tubes 5. We have found that, to accomplish this, while still maintaining the structural stability of the tubular member 1 during the performance of the aforementioned additional manufacturing steps thereon, the thickness of the portion 27 should not be substantially less than one-fifth of the thickness of the side walls 6 of the tubes 5 and not substantially more than one-half of that thickness. Thus, when making a heat exchanger, such as the heat exchanger 22, having a wall thickness of not substantially less than 0.030" and not substantially more than 0.060" the thickness of the portion 27 should not be substantially less than 0.006" and not substantially more than 0.030".

In all instances, where the aforementioned ratios of the thickness of the portion 27 to the thickness of the side walls 6 of the tubes 5 are maintained, it has been found that the adjacent tubes 5 may, in all instances, be readily separated by shearing or slicing the connectors 7 at the portion 27 without causing the aforementioned undesired distortion of the adjacent tubes 5; and, when the lower ratios of the thickness of the portion 27 to the thickness of the side walls 6 of the tubes 5 are present, such as, for example, the ratio of one to five, the adjacent tubes 5 may be separated from each other by severing the connectors 7 at the portion 27 thereof by wedging the adjacent tubes 5 apart and thus, in effect, tearing the connectors 7 at the portion 27 to thus sever the connection between the adjacent tubes 5. It appears that the foregoing is true even with tubular members wherein the side walls 6 of the tubes 5 thereof are of substantially greater thickness than the aforementioned 0.060", because, in such instances, the increased thickness of the side walls 6 of the tubes 5 is such as to effectively withstand the distorting forces applied thereto during such severing of the thicker connectors 7 therebetween.

It is to be observed that in the preferred form of the invention shown in FIGS. 1–5, the tubular member 1 is formed in such a manner that each of the tubes 5, even including the outermost tubes 5 at each side of the tubular member 1 embodies the wedge-shaped portion 23 and 24 projecting outwardly from the side wall portions 11 and 12 thereof, respectively. With this construction, even if all of the tubes 5 are separated from each other, at the completion of the manufacturing processes thereon, each is identical in construction, having a wedge-shaped rib afforded by the aforementioned end portions 23 and 24 of the connectors 7 projecting outwardly from the left and right sides thereof, respectively, as viewed in FIG. 1.

However, in affording the finished heat exchangers or other tubular members, it is not necessary that each of the tubes 5 be severed from each other. Heat exchangers embodying various numbers of ports 2 extending therethrough may be afforded by severing the appropriate numbers of tubes 5 in the heat exchanger blank 3, afforded by the completely processed tubular member 1, along the appropriate connectors 7. Thus, for example, if it were desired to afford a three-port heat exchanger and a one-port heat exchanger from the tubular member 1, shown in FIG. 1, it would merely be necessary to sever the heat exchanger blank 3 along the connector 7 disposed between the two wheels 20 and 21 shown in FIG. 2. On the other hand, if it were desired, for example, to afford two two-port heat exchangers, the heat exchanger blank 3 could be severed only along the middle connector 7 shown in FIG. 2.

It is to be observed that, although the connectors 7 are shown herein as having a butterfly cross-sectional shape, this is merely by way of illustration of the preferred embodiment of the present invention and not by way of limitation. Although, with such construction, certain advantages are realized, such as, for example, that when the severing of the connectors 7 takes place along the reduced portion 27 thereof, wedge shaped ribs 23 and 24, which are the same in size and shape are afforded on the outer lateral walls of the separated tubes 5, other shapes of connectors may be afforded, such as, for example, connectors, not shown, having a rectangular cross-sectional shape, of a suitable, uniform thickness throughout their widths, such as the width of the reduced portions 27, may be afforded without departing from the purview of the broader aspects of the present invention.

In FIG. 6 a modified form of the present invention in the form of a heat exchanger blank 3a is shown. The heat exchanger blank 3a is similar in many respects to the heat exchanger blank 3 shown in FIG. 2, and parts which are identical to parts shown in FIG. 2 are indicated by the same reference numerals and parts which are similar, but have been substituted for corresponding parts are indicated by the same reference numerals with the suffix "a" added.

Figure 2:
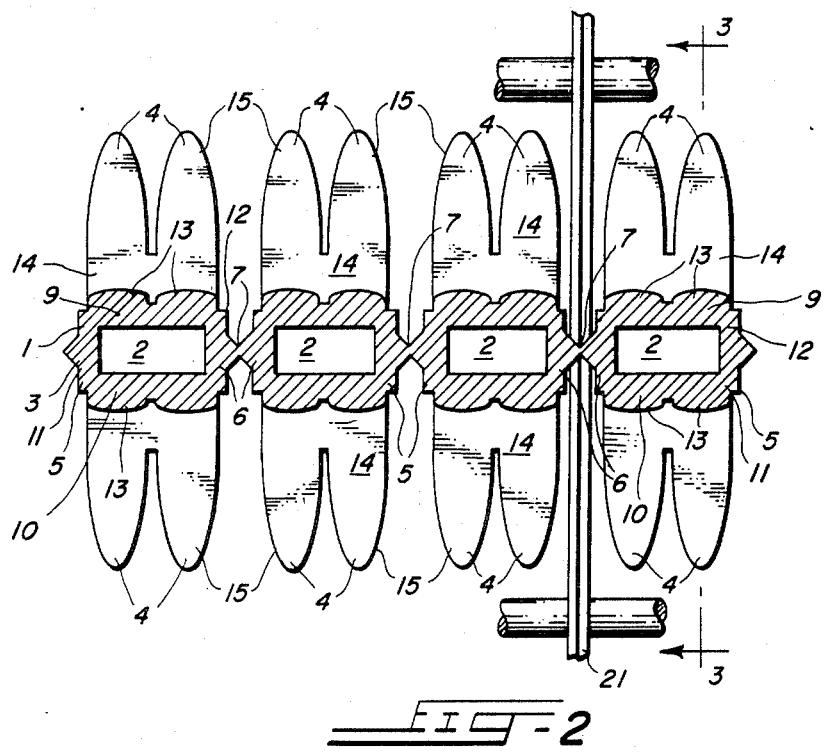
FIG. 2 is a transverse sectional view taken substantially along the line 2—2 in FIG. 1.

In the heat exchanger blank 3a shown in FIG. 6, the outermost wall portions 11a and 12a thereof are flat and do not embody the outwardly projecting rib portions 23 and 24 of the heat exchanger blank 3 shown in FIG. 2.

Also, the heat exchanger blank 3a is a two-port tubular member so that when the completed heat exchanger blank 3a is separated along the connector 7 between the two tubes 5a thereof, two heat exchangers having one flat lateral wall and one ribbed lateral wall are afforded.

With this construction, if it if desired to afford heat exchangers having different opposite lateral surfaces, and, therefore, different air flow characteristics across the opposite lateral surfaces, this may be readily accomplished by forming the original tubular membein the form of a two-port unit having the construction of the tubular member 1a, and, after completing the additional manufacturing steps thereon, severing the two tubes 5a from each other. Following such a procedure, enables individual heat exchangers of relatively narrow width to have the aforementioned manufacturing steps performed thereon while they are effectively connected to other stabilizing structure so as to overcome the aforementioned difficulties of holding tubular members of such narrow widths against twisting and turning, and enabling the manufacturing steps to be simultaneously performed on a plurality of tubes so as to conserve man-power and manufacturing time.

As will be appreciated by those skilled in the art, if it is desired to merely afford occasional heat exchangers having the one flat outer side of the heat exchangers afforded by the heat exchanger blank 1a, tubular members, not shown, having more than two ports therethrough, such as, for example, the tubular member 1 shown in FIG. 1, may be afforded wherein only the outside tubes 5 thereof have the flat outer walls, such as the walls 11a and 12a shown in FIG. 6, with the intermediate tubes connected together in the same manner as the intermediate tubes shown in FIG. 1. With such construction, if each of the tubes 5 are separated from each other after completion of the manufacturing processes thereon, only the two outermost heat exchangers will have the one flat wall and the remainder will have the ribbed construction, on each of the outer lateral walls, of the heat exchanger 22 shown in FIG. 4. Also, of course, by severing the heat exchanger blank afforded by a tubular member of the last mentioned type, which has more than two ports 2 therein at the appropriate place, multiple-port heat exchangers having a flat side wall portion at one lateral side thereof and a ribbed side wall portion at the other lateral side thereof may be afforded.

As will be appreciated by those skilled in the art, although the present invention is particularly well adapted for affording finned heat exchangers, and the like, the present invention, in its broader aspects, is not limited thereto. The method of the present invention, in its broader aspects, may be practiced to afford tubular members, in and of themselves. For example, a multi-port tubular member, such as the tubular member 1, may be originally formed and with or without additional manufacturing steps being performed thereon, it can be separated, in the aforementioned manner, into individual tubes or combinations of various numbers of tubes.

From the foregoing, it will be seen that the present invention affords a novel method of making a tubular article of manufacture.

Also, it will be seen that the present invention affords a novel method of making a heat exchanger.

In addition, it will be seen that the present invention affords a novel tubular article of manufacture as well as a novel heat exchanger.

Thus, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A heat exchanger blank comprising
   a. a one-piece body portion comprising
      (1) a plurality of elongated tubular members disposed in side-by-side relation to each other,
   b. each of said tubular members having a side wall,
   c. said side walls of adjacent ones of said tubular members being connected together by portions of said body portion which are lesser in thickness, than the adjacent side walls and extend the length of said body portion.

2. A heat exchanger blank as defined in claim 1, and which includes
   a. fins projecting outwardly from opposite sides of each of said tubular members.

3. A one-piece multi-ported tubular member consisting of
   a. a plurality of elongated tubes
      (1) each having a side wall, and
      (2) disposed in side-by-side relation to each other, and
   b. connector portions
      (1) disposed between adjacent ones of said tubes and extending the length thereof, and
      (2) holding said tubes in fixed relation to each other,
   c. said connector portions having a lesser thickness than that of the adjacent ones of said side walls to facilitate separation of adjacent ones to said tubes from each other without distorting the latter.

4. A one-piece, multi-ported tubular member as defined in claim 3, and in which
   a. said connector portions have a substantially butterfly cross-sectional shape, having
      (1) two outwardly flaring oppositely disposed outer edge portions connected together by an intermediate portion of reduced thickness.

5. A one-piece multi-ported tubular member having a length, width and thickness, and comprising
   a. a plurality of elongated tubes
      (1) extending longitudinally of said member,
      (2) being disposed in side-by-side relation to each other across the width of said member, and
      (3) each having a side wall, and
   b. connector portions
      (1) extending between adjacent ones of said tubes throughout the full length of the latter, and
      (2) connecting the latter together,
   c. said connector portions having portions, which extend the length thereof longitudinally of said adjacent tubes, having a lesser thickness, in the direction of the thickness of said member, than the thickness of the side walls of said adjacent tubes.

6. A heat exchanger comprising
   a. a one-piece elongated tubular member having a side wall defining a passageway extending longitudinally therethrough,
   b. said side wall having
      (1) an upper side,
      (2) a lower side, and
      (3) two oppositely disposed lateral sides,
   c. a plurality of fins projecting outwardly from said upper and lower sides,
   d. said fins on the respective said upper and lower sides being spaced from each other longitudinally of said tubular member, and
   e. one of said lateral sides having an elongated rib
      (1) projecting laterally outwardly therefrom, and
      (2) extending the full length thereof,
   f. said rib having an outside edge which is lesser in thickness in a direction parallel to said last mentioned lateral side than the thickness of said side wall.

* * * * *